3,183,167
STEAM COOLED NUCLEAR REACTOR
Norman Bradley, Culcheth, Warrington, England, assignor to United Kingdom Atomic Energy Authority, London, England
Filed Nov. 18, 1960, Ser. No. 70,251
Claims priority, application Great Britain, Nov. 26, 1959, 40,172/59
3 Claims. (Cl. 176—59)

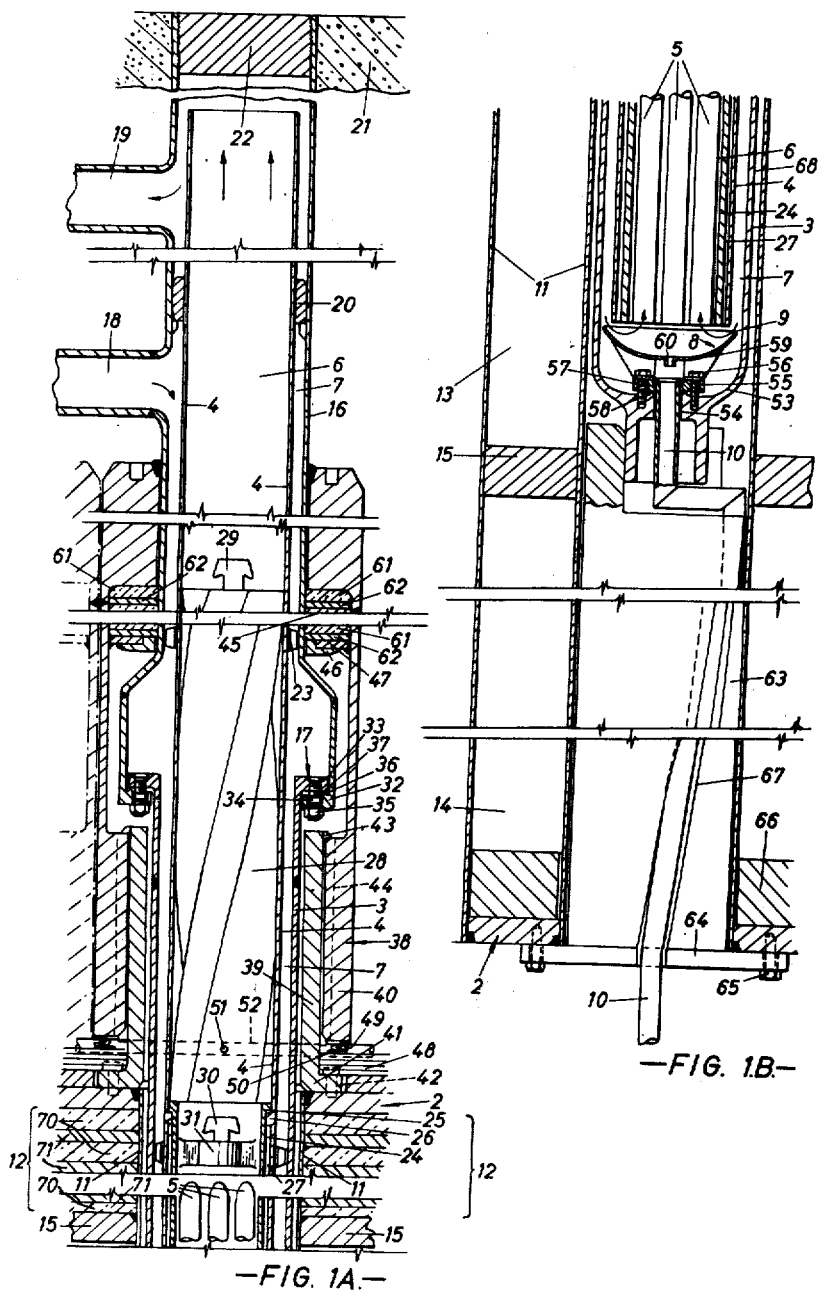

This invention relates to nuclear reactors of this kind comprising a moderator structure penetrated by a lattice of blind-ended channels orientated vertically with their blind ends lowermost, with nuclear fuel elements in the channels and with coolant flow barrier sleeves disposed lengthwise in the channels between the channel walls and the fuel elements to define outer, inflow paths with the channel walls and inner, outflow paths with the fuel elements. Such reactors are hereinafter referred to as "of the kind described."

When the coolant employed for such nuclear reactors is steam, problem arise in the removal of collected condensate from the lower ends of the channels, the condensate being formed by contact of inflowing steam with the cooler walls of the channels.

According to the invention a steam cooled reactor of the kind described is characterised in that each channel has beneath the lower end of its barrier sleeve a baffle which is so disposed with slight clearance from the channel walls to allow steam condensate to descend on the walls of the channel past the baffle and which is shaped to deflect steam coolant flowing down through the outer, inflow path to flow in counter-direction up through the inner, outflow path, means being provided for removing condensate collected below the baffle.

The invention provides a covering for collected condensate so that entrainment with outflowing steam is prevented. When little or no condensate has collected (for example, upon "start-up" of the reactor) the invention prevents the condensate removal lines from being subjected to the full force of inflowing steam.

An embodiment of the invention will now be described by way of example with reference to the accompanying drawings wherein:

FIGURES 1A and 1B respectively combine to provide a side view in medial section.

Referring to the figures, a steam-cooled, heavy water moderated nuclear reactor has a moderator-containing tank-like structure 2 provided with a lattice of vertically orientated fuel element channels 3 of blind-ended form and having internal coolant flow barrier sleeves 4 to accommodate fuel elements 5 and to define inner, outflow and outer, inflow paths 6 and 7 respectively. Dished baffles 8 are provided below the ends of each of the barrier sleeves 4, the baffles extending transversely across the bottom of the channels 3 with slight clearance 9 from the channel walls. Condensate is removed from the lower ends of the channels 3 by outlets 10 below the baffles 8.

The moderator tank 2 is pierced by a lattice of calandria tubes 11 which locate the channels 3, the tank 2 being divided by division plates 15 into three horizontal sections 12, 13 and 14 respectively. Section 14 contains light water ($H_2O$) for neutron shielding and section 13 the heavy water ($D_2O$) moderator whilst section 12 contains a structure of graphite granules 70 and boron steel plates 71 for neutron shielding, although it could contain a combination of graphite and light water.

The steam coolant is conducted to and from the channels 3 by pipes 16 connected to the channels 3 by demountable joints 17. The pipes 16 have coolant inlets and outlets 18 and 19 respectively, divided from each other by sealing rings 20 carried on the upper ends of the barrier sleeves 4 which extend into the pipes 16. The pipes 16 terminate at a charge face 21 and are pressure-sealed by removable plugs 22.

The barrier sleeves 4 are located within the channels 3 and pipes 16 by spiders 23 and support in turn the fuel elements 5 which are carried in sleeves 24 having lugs 25 attached to their upper ends. The lugs 25 rest upon support rings 26 attached to the inner walls of the barrier sleeves 4.

The sleeves 24 carrying the fuel elements 5 extend to the lower ends of the barrier sleeves 4, spaces 27 between the sleeves 4 and 24 providing thermal insulation to discourage the transfer of heat by conduction from the fuel elements 5 to the channels 3.

The upper ends of the sleeves 24 support removable neutron scatter plugs 28, which, whilst allowing a tortuous but unrestricted flow path to coolant, prevent the passage of neutrons along with the coolant by scattering and absorption. A full description of a neutron scatter plug is disclosed in my co-pending U.S. application Serial No. 834,190, filed Aug. 17, 1959, and now Patent No. 3,132,998, granted May 12, 1964. The neutron plugs 28 may be raised and lowered by lifting studs 29 attached thereto. Similar studs 30 are attached to spiders 31 carried in the upper ends of the sleeves 24.

The channels 3 are of zirconium and the pipes 16 of steel. As the co-efficient of expansion of zirconium is less than that of steel, the demountable joints 17 are designed accordingly. The joints 17 include flanged ends 32, 33 on pipes 16 and channels 3 respectively, clamped together by high-tensile steel studs 34 and nuts 35. The flanged end 32 of each steel pipe 16 has an annular ring 36 integral with the end 32 and mating with a face 37 on the end 33 of each zirconium channel 3. When the reactor is in operation and the joints 17 subjected to high temperatures, the annular rings 36 of the flanged ends 32 yield by plastic deformation to allow differential expansion of the channels 3 and pipes 16 whilst maintaining a leak-tight seal.

Stressing of the joints 17 by bending moments created by horizontal movement of the inlets and outlets 18, 19 of the pipes 16 are relieved by guide members 38 which allow lengthwise movement only of the pipes 16 and channels 3. This arrangement is disclosed more fully in my co-pending U.S. application Serial No. 848,722, filed Oct. 26, 1959. The guide members 38 include fixed parts 39 and movable parts 40. The fixed parts 39 have lower flanges 41 rigidly secured to the top of the moderator tank 2 by bolts 42 and have external splines 43 for sliding engagement with internal splines 44 of the movable parts 40. The upper ends of the movable parts 40 embrace the pipes 16 and are welded thereto. Recesses 45 formed within the movable parts 40 are closed by plates 46, 47 welded to pipes 16 and movable part 40 respectively. The recesses 45 are filled with a mixture of graphite granules 61 and boron steel plates 62 so that the close-packed guide members 38 provide a neutron shield above the moderator tank 2. The movable parts 40 are sealed to the upper face of a heat-insulating slab 48 covering the top of the moderator tank 2 by bellows 49 mounted on seal-plates 50. The bellows 49 have apertures 51 connected to a common take-off pipe 52 communicating with a sensing device so that out-leakage of reactor coolant may be readily detected.

The channels 3 have lower ends 53 with apertures 54 to accommodate the condensate outlet pipes 10 which are connected to external drain traps of conventional type (not shown). The outlet pipes 10 are of steel and have steel flanges 55 bolted to the zirconium channel ends 53 by high tensile-steel bolts 56. The flanges 55 have annular rings 57 integral with the flanges mating with faces 58 on the channel ends 53 to provide joints similar to the joints 17 connecting the upper ends of the channels 3 to the pipes 16. The flanges 55 also carry plates 59 which support the baffles 8. The baffles have central drain holes 60.

The lower ends of the calandria tubes 11 are closed by neutron shield plugs 63 having flanges 64 secured to the bottom of the moderator tank 2 by bolts 65, the tank 2 being provided with steel plates 66 for shielding purposes. The plugs 63 have apertures 67 to accommodate the condensate outlet pipes 10.

Spaces 68 between the calandria tubes 11 and channels 3 provide thermal insulation to discourage the transfer of heat by conduction from the channels 3 to the calandria tubes 11 and hence to the moderator contained in the tank 2.

When the reactor is in operation, any condensate deposited by the inflowing steam coolant passing down through the outer flow paths 7 between the channels 3 and the barrier sleeves 4 will be deposited upon the walls of the relatively cool channels 3. The slight clearance 9 between the baffles 8 and the walls of the channels 3 allows the condensate to descend between the edge of the baffles 8 and the walls of the channels 3 where it builds up in level until it spills over into the mouths of the outlets 10. The latter are covered by the baffles 8 which redirect the steam flow in an upward direction towards the inner flow path 6. This covering is of particular advantage upon start-up of the reactor when little or no condensate has collected and the condensate outlets 10 would otherwise be subjected to the full force of inflowing steam.

Condensate formed upon shut-down of the reactor and tending to collect in the spaces defined by the upper faces of the baffles 8 in drained off as it collects by way of the drain holes 60 to prevent entrainment with the steam coolant upon the next start-up.

I claim:

1. In a steam cooled nuclear reactor having a moderator structure defining a lattice of vertically extending blind-end channels with their blind ends lowermost; the combination comprising flow barrier tubes respectively disposed lengthwise in the channels and terminating short of said blind ends, said barrier tubes defining outer inflow paths and inner outflow paths for the steam coolant, nuclear fuel elements in said inner outflow paths, a baffle member disposed beneath each of said barrier tubes and traversing the greater part of the span of the channels to define condensate collecting chambers with the lower ends of the channels, the periphery of each of said baffle members being clear at least in part from the inner walls of the respective one of said channels for the passage of steam condensate from above the said baffle members to said chambers and said baffle members shaped to constrain steam coolant flowing down through the said outer inflow paths to flow in counter-direction up through the said inner outflow paths, and means in respect of each of said channels for removing steam condensate collected in the respective one of said chambers.

2. In a steam cooled nuclear reactor having a moderator structure defining a lattice of vertically extending blind-end channels with their blind ends lowermost; the combination comprising flow barrier tubes respectively disposed lengthwise in the channels and terminating short of said blind ends, said barrier tubes defining outer inflow paths and inner outflow paths for the steam coolant, nuclear fuel elements in said inner outflow paths, a baffle member disposed beneath each of said barrier tubes and traversing the greater part of the span of the channels to define condensate collecting chambers with the lower ends of the channels, the periphery of each of said baffle members being clear at least in part from the inner walls of the respective one of said channels for the passage of steam condensate from above the said baffle members to the said chambers, and said baffle members presenting a generally concave face towards impinging steam coolant flowing downwardly through said outer inflow paths such that said steam coolant is deflected in counter direction up through said inner outflow paths and means in respect of each of said channels for removing steam condensate collected in the respective one of said chambers.

3. In a steam cooled nuclear reactor as claimed in claim 2, means defining a condensate drain aperture penetrating the centre of each of said baffle members.

References Cited by the Examiner

UNITED STATES PATENTS

| 60,470 | 12/66 | Bristol | 122—489 |
|---|---|---|---|
| 623,554 | 4/99 | McAllister et al. | 122—489 X |
| 1,748,067 | 2/30 | Howley | 122—489 |
| 2,999,059 | 9/61 | Treshow | 176—42 |
| 3,053,746 | 9/62 | Challender et al. | 176—27 |

OTHER REFERENCES

Yvon: Proceedings of the Internal Conference on the Peaceful Uses of Atomic Energy, 1955, vol. 2, page 345.

"Nuclear Power," September 1957; "Coolant Choice for the V.H.T. Reactor," Peter Fortescue; pp. 381–385.

CARL D. QUARFORTH, *Primary Examiner.*

REUBEN EPSTEIN, *Examiner.*